US009966576B2

(12) United States Patent
Han et al.

(10) Patent No.: US 9,966,576 B2
(45) Date of Patent: May 8, 2018

(54) SECONDARY BATTERY

(71) Applicants: SAMSUNG SDI CO., LTD., Yongin-si, Gyeonggi-do (KR); ROBERT BOSCH GMBH, Stuttgart (DE)

(72) Inventors: Min-Yeol Han, Yongin-si (KR); Zin Park, Yongin-si (KR); Sang-Won Byun, Yongin-si (KR); Seung-Bok Lee, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 461 days.

(21) Appl. No.: 13/956,584

(22) Filed: Aug. 1, 2013

(65) Prior Publication Data
US 2014/0255740 A1    Sep. 11, 2014

(30) Foreign Application Priority Data

Mar. 6, 2013  (KR) ........................ 10-2013-0023940

(51) Int. Cl.
*H01M 2/02*    (2006.01)
*H01M 10/04*    (2006.01)
*H01M 2/26*    (2006.01)
*H01M 10/42*    (2006.01)

(52) U.S. Cl.
CPC ............. *H01M 2/02* (2013.01); *H01M 2/263* (2013.01); *H01M 10/0431* (2013.01); *H01M 10/4235* (2013.01); *H01M 2200/00* (2013.01)

(58) Field of Classification Search
CPC .... H01M 2/02; H01M 2/0202; H01M 2/0237; H01M 10/0431; H01M 2/263; H01M 10/4235; H01M 2200/00; H01M 2/18; Y02E 60/122

See application file for complete search history.

(56) References Cited

U.S. PATENT DOCUMENTS

| 6,713,211 B2 * | 3/2004 | Morishita ............. H01M 2/263 429/131 |
| 2004/0142236 A1 * | 7/2004 | Kim .................... H01M 2/0202 429/144 |
| 2004/0191612 A1 * | 9/2004 | Akita .................. H01M 2/0426 429/94 |

(Continued)

FOREIGN PATENT DOCUMENTS

JP    2004-253330 A    9/2004
KR    10-2008-0085316 A    9/2008

(Continued)

OTHER PUBLICATIONS

Korean Office Action dated May 17, 2016.
Korean Registration Determination Certificate dated Nov. 25, 2016.

*Primary Examiner* — Lisa S Park
(74) *Attorney, Agent, or Firm* — Lee & Morse, P.C.

(57) ABSTRACT

A secondary battery includes an electrode assembly, a case having an opening at an upper portion to accommodate the electrode assembly, a cap plate for covering the opening of the case, and a retainer surrounding a corner portion of the electrode assembly, the retainer being disposed between the electrode assembly and a bottom of the case.

6 Claims, 8 Drawing Sheets

(56) References Cited

U.S. PATENT DOCUMENTS

| | | | |
|---|---|---|---|
| 2005/0084753 A1* | 4/2005 | Kim | H01M 2/0277 |
| | | | 429/186 |
| 2006/0057456 A1* | 3/2006 | Hong | H01M 2/0275 |
| | | | 429/129 |
| 2007/0224501 A1* | 9/2007 | Yoon | H01M 2/0202 |
| | | | 429/176 |
| 2008/0233474 A1 | 9/2008 | Son et al. | |
| 2010/0227215 A1* | 9/2010 | Cheon | H01M 2/0232 |
| | | | 429/178 |
| 2011/0117421 A1 | 5/2011 | Kim et al. | |
| 2011/0200865 A1 | 8/2011 | Byun et al. | |
| 2011/0311851 A1* | 12/2011 | Shinoda | H01M 2/263 |
| | | | 429/94 |
| 2012/0052341 A1* | 3/2012 | Kim | H01M 2/043 |
| | | | 429/53 |
| 2012/0214050 A1* | 8/2012 | Kim | H01M 2/263 |
| | | | 429/179 |

FOREIGN PATENT DOCUMENTS

| | | |
|---|---|---|
| KR | 10-2011-0053712 A | 5/2011 |
| KR | 10-2011-0095108 A | 8/2011 |
| KR | 10-2012-0024412 A | 3/2012 |
| KR | 10-2012-0096157 A | 8/2012 |

\* cited by examiner

SECONDARY BATTERY

CROSS-REFERENCE TO RELATED APPLICATION

The present application claims priority under 35 U.S.C. § 119 to Korean Patent Application No. 10-2013-0023940, filed on Mar. 6, 2013, in the Korean Intellectual Property Office, and entitled: "Secondary Battery," which is incorporated by reference herein in its entirety.

BACKGROUND

1. Field

One or more embodiments relate to secondary batteries.

2. Description of the Related Art

Generally, unlike a primary battery that cannot be recharged, a secondary battery can be recharged. The secondary battery is used as an energy source of, e.g., a mobile device, an electric car, a hybrid car, an electric bicycle, or as an uninterruptible power supply. The secondary battery may be used in a single battery form or in an electric module form, wherein a plurality of secondary batteries are electrically connected to each other into one unit, according to the type of an external device to which the secondary battery is connected.

SUMMARY

One or more embodiments are directed to a secondary battery having improved stability by preventing an electric short circuit between an electrode assembly and a case.

Additional aspects will be set forth in part in the description which follows and, in part, will be apparent from the description, or may be learned by practice of the presented embodiments.

According to one or more embodiments, a secondary battery includes an electrode assembly, a case having an opening at an upper portion to accommodate the electrode assembly, a cap plate for covering the opening of the case, and a retainer surrounding a corner portion of the electrode assembly and disposed between the electrode assembly and a bottom of the case.

The retainer may surround a bottom corner portion of the electrode assembly adjacent to the bottom of the case.

The retainer may include a first retainer and a second retainer respectively formed at two end corner portions of the electrode assembly.

The first and second retainers may be respectively formed at one end corner portion and other end corner portion of the electrode assembly, and may be spaced apart from each other.

The first and second retainers may not extend toward a center portion between the two end corner portions of the electrode assembly.

The center portion of the electrode assembly may be spaced apart from the bottom of the case.

The electrode assembly may have a roll shape, wherein a first electrode plate, a second electrode plate, and a separator disposed between the first and second electrode plates may be wound together, a plurality of active-material-non-coated portions of the first electrode plate, which overlap each other and are formed at one end portion of the electrode assembly, and a plurality of active-material-non-coated portions of the second electrode plate, which overlap each other and are formed at other end portion of the electrode assembly.

The retainer may include a first retainer surrounding the plurality of active-material-non-coated portions of the first electrode plate, and a second retainer surrounding the plurality of active-material-non-coated portions of the second electrode plate.

The retainer may include first and second walls facing each other and surrounding main surfaces of the electrode assembly, a side wall surrounding a side surface of the electrode assembly between the first and second walls, and a bottom wall surrounding a bottom of the electrode assembly between the first and second walls.

An accommodation space wherein the corner portion of the electrode assembly is inserted and accommodated may be formed between the first and second walls, the side wall, and the bottom wall.

The retainer may be formed of a material having an electric insulating property.

According to one or more embodiments, a secondary battery also includes an electrode assembly, a case having an opening at an upper portion to accommodate the electrode assembly, a cap plate for covering the opening of the case, and a coating unit coated on an corner portion of the electrode assembly so as to be formed between the electrode assembly and a bottom of the case.

The coating unit may be formed at a bottom corner portion of the electrode assembly adjacent to the bottom of the case.

The coating unit may include a first coating unit and a second coating unit respectively formed at one end corner portion and other end corner portion of the electrode assembly.

The first and second coating units may be respectively formed at the one end corner portion and the other end corner portion of the electrode assembly, and may be spaced apart from each other.

The first and second coating units may not extend toward a center portion between two end corner portions of the electrode assembly.

The electrode assembly may have a roll shape, wherein a first electrode plate, a second electrode plate, and a separator disposed between the first and second electrode plates may be wound together, a plurality of active-material-non-coated portions of the first electrode plate, which overlap each other and are formed at one end portion of the electrode assembly, and a plurality of active-material-non-coated portions of the second electrode plate which overlap each other and are formed at another end portion of the electrode assembly.

The coating unit may include a first coating unit individually formed with respect to the plurality of active-material-non-coated portions of the first electrode plate, and a second coating unit individually formed with respect to the plurality of active-material-non-coated portions of the second electrode plate.

BRIEF DESCRIPTION OF THE DRAWINGS

These and/or other aspects will become apparent and more readily appreciated from the following description of the embodiments, taken in conjunction with the accompanying drawings, of which.

DETAILED DESCRIPTION

Figure 1:
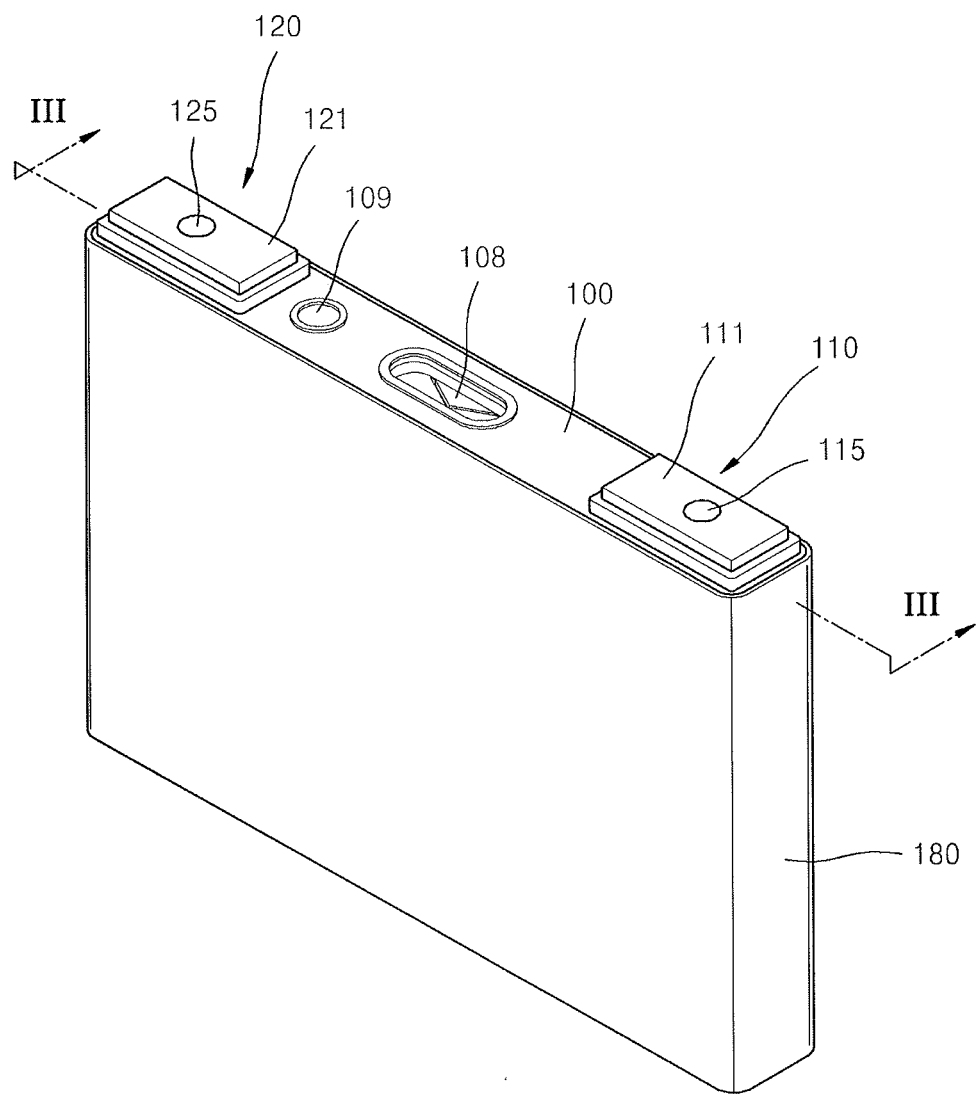
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Reference will now be made in detail to embodiments, examples of which are illustrated in the accompanying drawings, wherein like reference numerals refer to like elements throughout.

FIG. 1 illustrates a perspective view of a secondary battery according to an embodiment. Referring to FIG. 1, a pair of first and second electrode terminals 110 and 120 having opposite polarities may protrude from the secondary battery. For example, the first and second electrode terminals 110 and 120 may be electrically connected to an electrode assembly accommodated inside the secondary battery, and may respectively operate as a positive electrode terminal and a negative electrode terminal to externally supply discharge power accumulated in the secondary battery or to externally receive charge power by being electrically connected to a first electrode plate and a second electrode plate of the electrode assembly. For example, the first and second electrode terminals 110 and 120 may be respectively formed at two edges of the secondary battery.

Alternatively, a cap plate 100 of the secondary battery may operate as a terminal by being electrically connected to the electrode assembly. In this case, one of the first and second electrode terminals 110 and 120 may be omitted.

Figure 2:
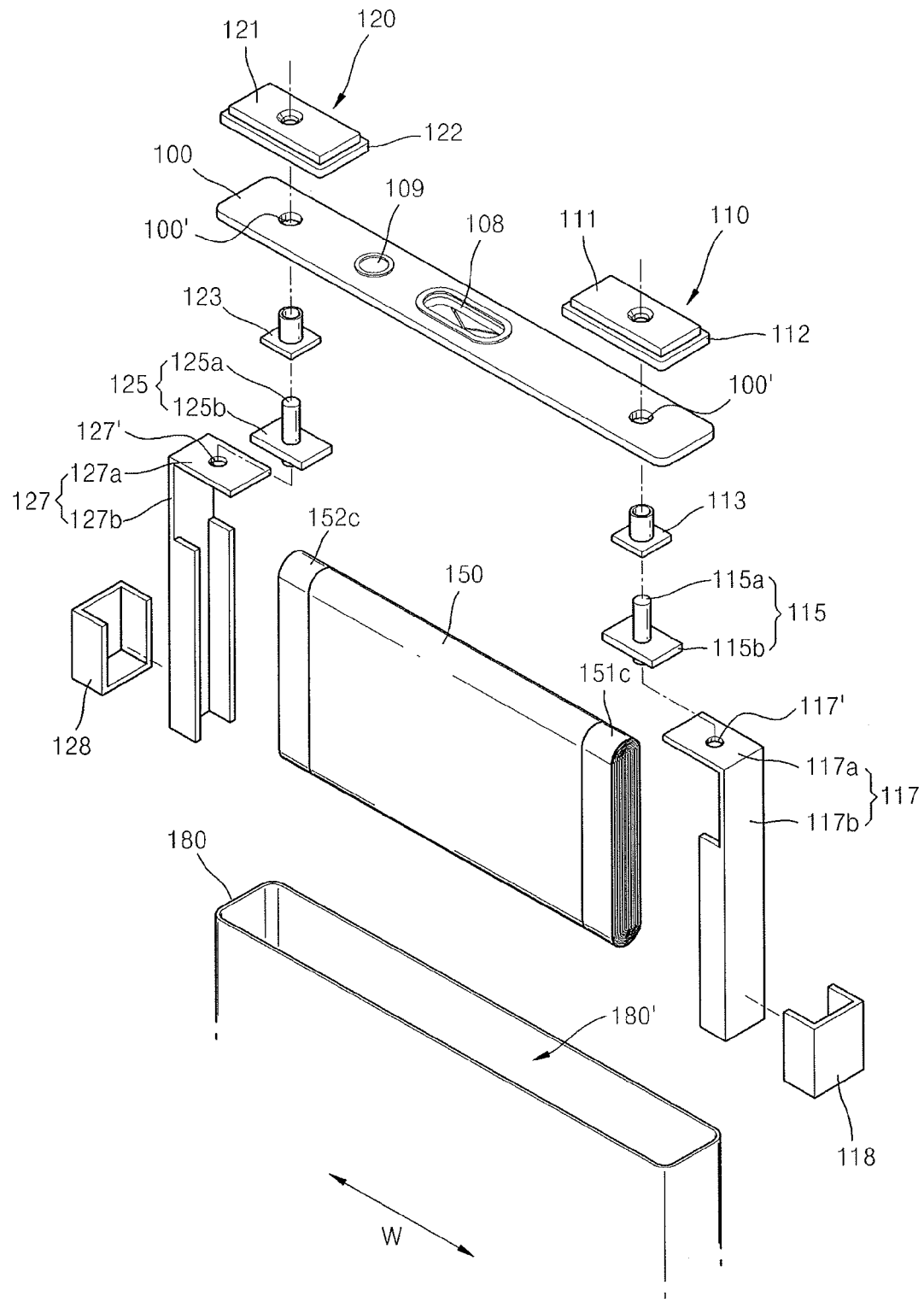
FIG. 2 illustrates an exploded perspective view of the secondary battery of FIG. 1.
Figure 3:
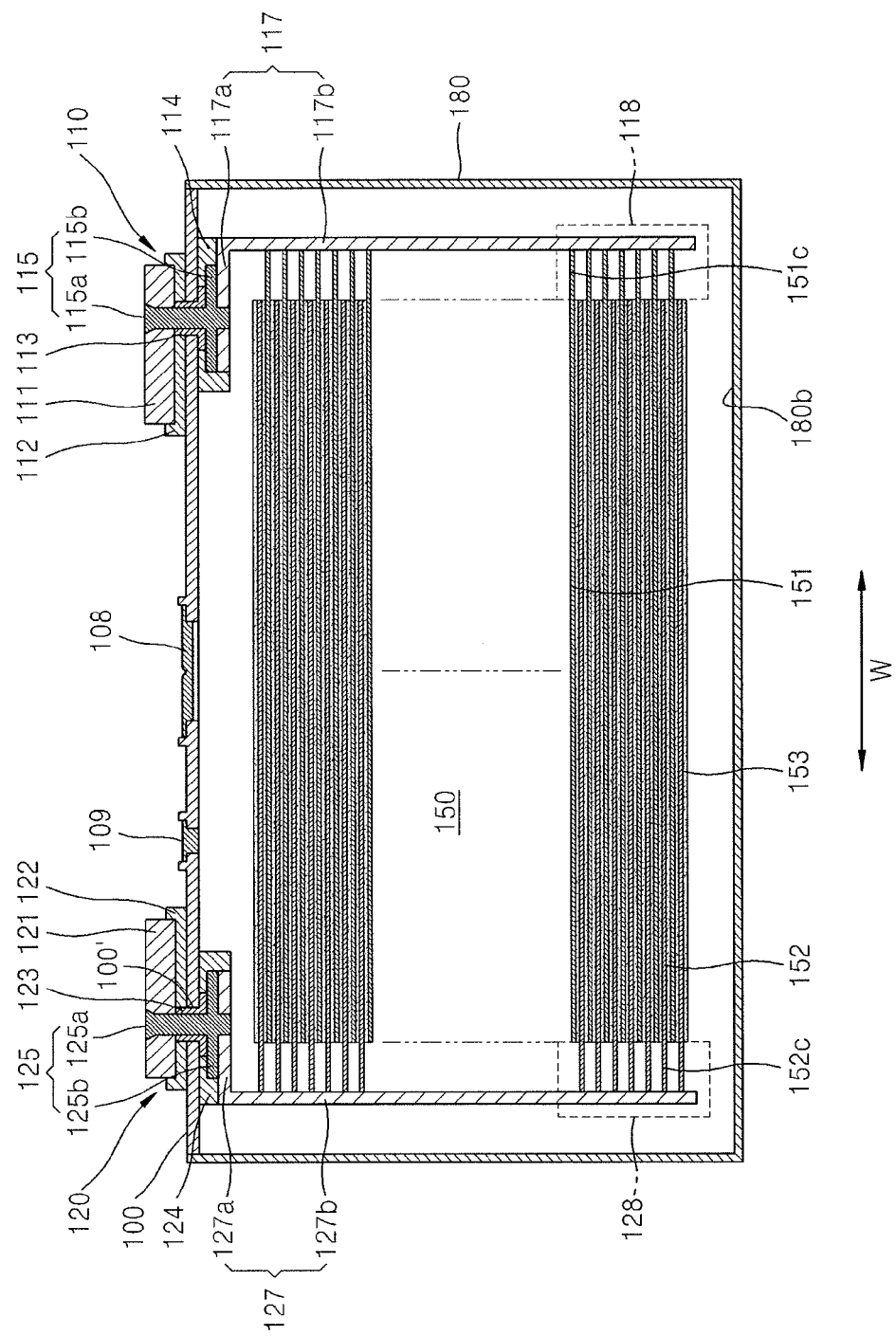
FIG. 3 illustrates a cross-sectional view taken along line of FIG. 1.

FIG. 2 illustrates an exploded perspective view of the secondary battery of FIG. 1, according to an embodiment, and FIG. 3 is a cross-sectional view taken along line III-III of FIG. 1. Referring to FIGS. 2 and 3, the secondary battery includes an electrode assembly 150, a case 180 accommodating the electrode assembly 150, first and second retainers 118 and 128 inserted into the case 180 to surround corner portions of the electrode assembly 150, and the cap plate 100 for covering an opening 180' at an upper portion of the case 180.

Figure 4:
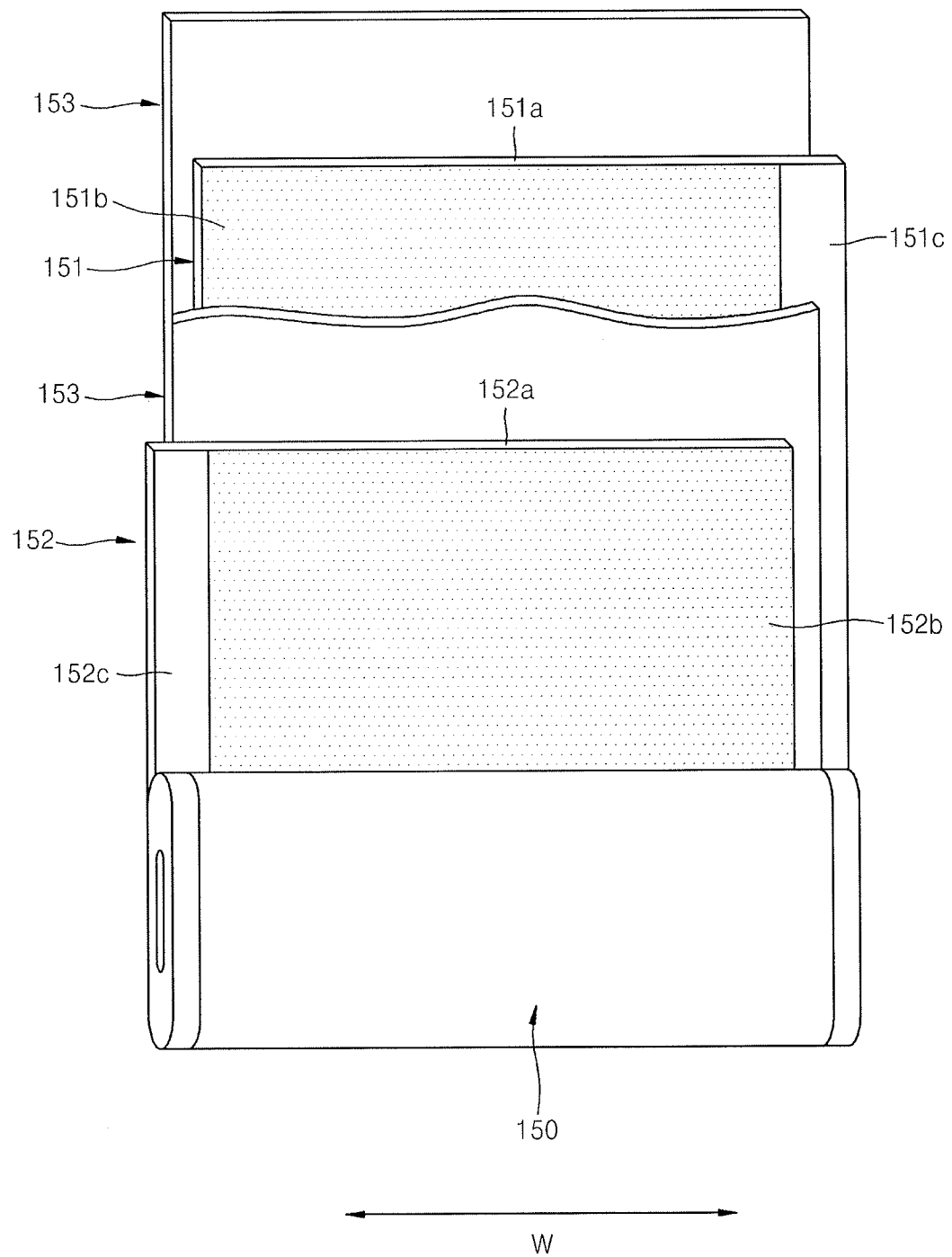
FIG. 4 illustrates a spread-out view of an electrode assembly of FIG. 2.

FIG. 4 illustrates a spread-out view of the electrode assembly 150 of FIG. 2. Referring to FIG. 4, the electrode assembly 150 may include first and second electrode plates 151 and 152, and a separator 153 disposed therebetween. The electrode assembly 150 may be of a wound type, i.e., where the first and second electrode plates 151 and 152, and the separator 153 are wound in a jelly roll shape, or of a stacked type, i.e., where the first and second electrode plates 151 and 152, and the separator 153 are alternately stacked on each other.

The first electrode plate 151 may include a first current collector 151a and a first active material layer 151b formed on at least one surface of the first current collector 151a. A first active-material-non-coated portion 151c, i.e., where the first active material layer 151b is not formed, may be formed on one edge of the first electrode plate 151 along a width direction W of the first current collector 151a. The second electrode plate 152 may include a second current collector 152a and a second active material layer 152b formed on at least one surface of the second current collector 152a. A second active-material-non-coated-portion 152c, i.e., where the second active material layer 152b is not formed, may be formed on one edge of the second electrode plate 152 along the width direction W of the second current collector 152a. The first and second active-material-non-coated portions 151c and 152c may be disposed at opposite edges of the electrode assembly 150 along the width direction W. As will be described below, the electrode assembly 150 is accommodated in the case 180, such that the first and second active-material-non-coated portions 151c and 152c are disposed at left and right edges of the case 180.

Referring back to FIGS. 2 and 3, the first and second retainers 118 and 128 may be assembled with the electrode assembly 150. The first and second retainers 118 and 128 may be formed to surround the corner portion of the electrode assembly 150, and may be disposed between the electrode assembly 150 and a bottom 180b of the case 180. For example, the first and second retainers 118 and 128 may be formed to surround a bottom corner portion of the electrode assembly 150 adjacent to the bottom 180b of the case 180. The first and second retainers 118 and 128 may be formed to surround two bottom end corner portions of the electrode assembly 150 and to be spaced apart in the width direction W. That is, the first and second retainers 118 and 128 may be respectively formed on one bottom end corner portion of the electrode assembly 150 adjacent to the bottom 180b of the case 180 and on another bottom end corner portion of the electrode assembly 150 adjacent to the bottom 180b of the case 180.

The first and second retainers 118 and 128 may surround the corner portion of the electrode assembly 150. For example, the first and second retainers 118 and 128 may surround the first and second active-material-non-coated portions 151c and 152c, respectively, such that the first and second active-material-non-coated portions 151c and 152c are not exposed. That is, the first and second retainers 118 and 128 may insulate the first and second active-material-non-coated portions 151c and 152c from the case 180 by surrounding, e.g., covering, the first and second active-material-non-coated portions 151c and 152c, i.e., where metal materials of the first and second electrode plates 151 and 152 are exposed. Accordingly, the first and second retainers 118 and 128 may be formed as insulating materials for preventing an electric short circuit between the electrode assembly 150 and the case 180, and for mutually insulating the electrode assembly 150 and the case 180 from each other.

The secondary battery may be used as a single battery according to a type of an external device connected to the secondary battery, or as a plurality of secondary batteries electrically connected and modularized into one unit, e.g., if high capacity and high output power are required. When a plurality of secondary batteries is modularized, the secondary batteries may be electrically connected to each other in series or in parallel via a bus bar (not shown). When the electric connection among the plurality of secondary batteries is disconnected, e.g., due to malfunction of the secondary batteries or due to operation of a safety device, e.g., a fuse, a considerably high voltage may be trapped inside the secondary battery including or adjacent to the disconnected region. For example, a high voltage according to the modularization may be trapped at one end of the disconnected region, whereas a floating voltage or a low voltage, e.g., close to a ground voltage, may be trapped at the other end of the disconnected region. Also, a reverse potential, i.e., a positive potential of a normal state switched to a negative potential or vice-versa, may be trapped.

When a high voltage, e.g., a reverse potential of a high voltage, is trapped inside the conventional secondary battery, an electric short circuit path may be formed between the electrode assembly and its case due to sludge generated according an electrochemical reaction among the electrode assembly, the case, and an electrolyte (not shown) filled therebetween. For example, sludge may be formed as first and second electrode plates, e.g., formed of copper, the case, e.g., formed of aluminum, and the electrolyte react with each other, so the sludge may cause an electric short circuit between the electrode assembly and the case.

However, according to example embodiments, as the first and second retainers 118 and 128 are assembled to surround the electrode assembly 150, the first and second retainers 118 and 128 may prevent or substantially minimize the electrochemical reaction between the electrode assembly 150 and the case 180, thereby preventing or substantially minimizing the consequent formation of sludge. In addition, potential accidents caused by the short circuit between the electrode assembly 150 and the case 180 may be reduced during malfunction or an emergency situation when a protection operation is performed.

In detail, the first and second retainers 118 and 128 are assembled to surround the corner portion of the electrode assembly 150, e.g., to surround the first and second active-material-non-coated portions 151c and 152c of the corner portion, thereby effectively preventing a reaction between metal components of the first and second active-material-non-coated portions 151c and 152c and the case 180, and preventing formation of the sludge. Thus, the first and second retainers 118 and 128 may prevent an electric short circuit between the first and second active-material-non-coated portions 151c and 152c, i.e., where metal materials are exposed, and the case 180.

For example, the first and second retainers 118 and 128 may be assembled, e.g., attached, to the corner portion, e.g., to the bottom corner portion, of the electrode assembly 150. In other words, as will be apparent to a person of ordinary skill in the art from the foregoing description and from the illustration of the second retainer 128 in FIG. 3, each of the first and second retainers 118 and 128 may overlap portions of a bottom surface and side surfaces of the electrode assembly 150 that include uncoated metal, i.e., overlap the exposed first and second active-material-non-coated portions 151c and 152c. Since the electrolyte is concentrated on the bottom 180b of the case 180 due to its weight, portions of the first and second retainers 118 and 128 overlapping the exposed first and second active-material-non-coated portions 151c and 152c may, e.g., completely, cover and insulated the bottom corner portion of the electrode assembly 150 from the bottom 180b of the case 180.

For example, the pair of the first and second retainers 118 and 128 may be formed at one end corner portion and the other end corner portion of the electrode assembly 150 in the width direction W. The first retainer 118 may surround the one corner portion and the second retainer 128 may surround the other corner portion. For example, as will be apparent to a person of ordinary skill in the art from the foregoing description and from drawings, a bottom of each of the first and second retainers 118 and 128 may extend along the width direction W to completely cover the exposed length of the respective first and second active-material-non-coated portions 151c and 152c along the width direction W. As such, the first and second active-material-non-coated portions 151c and 152c may be covered and separated from the bottom 180b of the case 180, i.e., the bottoms of the first and second retainers 118 and 128 cover and separate the respective first and second active-material-non-coated portions 151c and 152c.

The first and second retainers 118 and 128 are spaced apart from each other along the width direction W and are disconnected from each other. In other words, the first and second retainers 118 and 128 may be isolated from each other around a center portion of the electrode assembly 150, and are not continuously connected to each other. That is, the first and second retainers 118 and 128 are respectively formed at one end portion and other end portion of the electrode assembly 150, and do not extend toward the center portion of the electrode assembly 150 respectively from the one end and the other end portions. Accordingly, the center portion of the electrode assembly 150 is exposed by the first and second retainers 118 and 128, so a predetermined space may be obtained below the electrode assembly 150, e.g., a space may be defined between the electrode assembly and the bottom 180b of the case 180. In other words, two end portions of the electrode assembly 150 are supported at a predetermined height, i.e., a thickness of the bottom of the first and second retainers 118 and 128, from the bottom 180b of the case 180 by the first and second retainers 118 and 128, so a space may be formed below the center portion of the electrode assembly 150. As will be described below, a number of turns of the electrode assembly 150 may be increased due to the space below the electrode assembly 150, and a storage capacity of the secondary battery may be increased by increasing a facing area between the first and second electrode plates 151 and 152 of the electrode assembly 150.

Meanwhile, in FIGS. 1-3, a reference numeral 108 denotes a safety vent formed in the cap plate 100. The safety vent 108 has relatively low mechanical strength compared to other regions of the cap plate 100, and may break to release an internal pressure of the electrode assembly 150, if the internal pressure is equal to or above a predetermined value. Also, a reference numeral 109 denotes a sealing member for sealing an electrolyte injection hole. The sealing member 109 is assembled in the electrolyte injection hole after the electrolyte is injected into the case 180.

Figure 5:
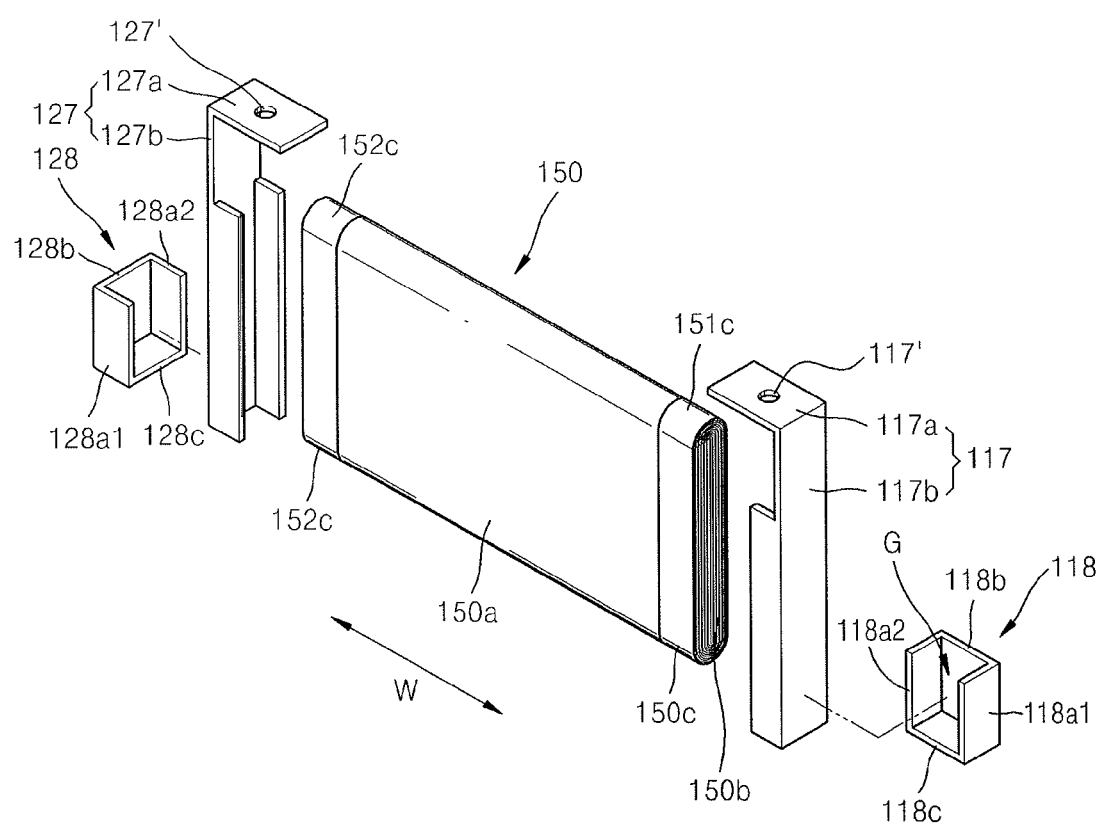
FIG. 5 illustrates a view of an arrangement between the electrode assembly and first and second retainers of FIG. 2.

FIG. 5 illustrates a view of an arrangement between the electrode assembly 150 and the first and second retainers 118 and 128 of FIG. 2. Referring to FIG. 5, the first and second retainers 118 and 128 are formed to surround the corner portion of the electrode assembly 150. According to an embodiment, the first and second retainers 118 and 128 may surround the corner portion of the electrode assembly 150 through collector members 117 and 127, e.g., the collector members 117 and 127 may be positioned between the electrode assembly 150 and respective first and second retainers 118 and 128 so as only bottoms of the first and second retainers 118 and 128 may directly contact the electrode assembly 150. However, embodiments are not limited thereto, e.g., the first and second retainers 118 and 128 may directly surround the corner portion of the electrode assembly 150 without the collector members 117 and 127.

The first and second retainers 118 and 128 may surround, e.g., overlap, a main surface 150a, a side surface 150b, and a bottom surface 150c of the electrode assembly 150 so as to surround the corner portion of the electrode assembly 150. In detail, the first and second retainers 118 and 128 may include first and second walls 118a1 and 118a2, and 128a1 and 128a2, facing each other to surround the main surface 150a of the electrode assembly 150, side walls 118b and 128b surrounding the side surface 150b of the electrode assembly 150 between the first and second walls 118a1 and 118a2, and 128a1 and 128a2, and bottom surfaces 118c and 128c, surrounding the bottom surface 150c of the electrode assembly 150 between the first and second walls 118a1 and 1182a, and 128a1 and 128a2.

The first and second walls 118a1 and 1182a, and 128a1 and 128a2, may be disposed to face each other to surround the main surface 150a on two sides of the electrode assembly 150, and the side walls 118b and 128b and the bottom walls 118c and 128c may be formed to respectively surround the side surface 150b and the bottom surface 150c of the electrode assembly 150 while connecting the first and second walls 118a1 and 1182a, and 128a1 and 128a2 between the first and second walls 118a1 and 1182a, and 128a1 and 128a2. For example, the first and second walls 118a1 and 1182a, and 128a1 and 128a2, the side walls 118b and 128b, and the bottom walls 118c and 128c may be, e.g., directly, connected to each other without any gap. Specifically, the first and second walls 118a1 and 1182a, and 128a1 and 128a2 contacting the bottom walls 118c and 128c, and the side walls 118b and 128c contacting the bottom walls 118c and 128c may be connected to each other without a gap.

In contrast, if a gap is formed between the first and second walls 118a1 and 1182a, and 128a1 and 128a2, and the bottom walls 118c and 128c, the electrolyte may penetrate through the gap, thereby causing a chemical reaction between the electrode assembly 150 and the case 180. Thus, existence of a gap may cause an electric short circuit to be generated due to a sludge caused by the chemical reaction.

The first and second retainers 118 and 128 formed by the first and second walls 118a1 and 1182a, and 128a1 and 128a2, the side walls 118b and 128b, and the bottom walls 118c and 128c may have a hexahedron shape with two open surfaces. The electrode assembly 150 may be inserted through the two open surfaces, so that the corner portions of the electrode assembly 150 is accommodated in the first and second retainers 118 and 128. The first and second walls 118a1 and 1182a, and 128a1 and 128a2, the side walls 118b and 128b, and the bottom walls 118c and 128c may respectively form surfaces of the hexahedron. The first and second retainers 118 and 128 may have any one of various polyhedron shapes including a hexahedron shape, or may have a curved shape.

The corner portion of the electrode assembly 150 may be inserted in an accommodation space G formed by the first and second walls 118a1 and 1182a, and 128a1 and 128a2, the side walls 118b and 128b, and the bottom walls 118c and 128c. The corner portion of the electrode assembly 150 may be surrounded by the first and second walls 118a1 and 1182a, and 128a1 and 128a2, the side walls 118b and 128b, and the bottom walls 118c and 128c. Thus, portions of the main surface 150a, the side surface 150b, and the bottom surface 150c of the electrode assembly 150 may be covered.

For example, the electrode assembly 150 may have a roll shape, wherein the first and second electrode plates 151 and 152, and the separator 153 disposed therebetween, are wound together, and the plurality of first active-material-non-coated portions 151c that overlap each other are formed at one end portion of the electrode assembly 150. The first retainer 118 may surround all of the first active-material-non-coated portions 151c, e.g., may surround the first active-material-non-coated portions 151c at once instead of individually surrounding each of the first active-material-non-coated portions 151c.

Similarly, the plurality of second active-material-non-coated portions 152c that overlap each other are formed at the other end portion of the electrode assembly 150. The second retainer 128 may surround all of the second active-material-non-coated portions 152c, e.g., may surround the second active-material-non-coated portions 152c at once instead of individually surrounding the second active-material-non-coated portions 152c.

Hereinafter, the structure of the secondary battery of FIGS. 2 and 3 will be described. The cap plate 100 may be assembled to the opening 180' of the case 180 accommodating the electrode assembly 150 to seal the electrode assembly 150, and the first and second electrode terminals 110 and 120 electrically connected to the electrode assembly 150 may be formed outside the cap plate 100 so as to electrically connect the electrode assembly 150 and an external circuit (not shown) or the electrode assembly 150 and a neighboring secondary battery. The first and second electrode terminals 110 and 120 may have opposite polarities, and may be respectively electrically connected to the first and second electrode plates 151 and 152 of the electrode assembly 150.

The first electrode terminal 110 may include a first collector terminal 115, and a first terminal plate 111 connected to the first collector terminal 115. Similarly, the second electrode terminal 120 may include a second collector terminal 125, and a second terminal plate 121 connected to the second collector terminal 125.

The first and second terminal plates 111 and 121 may be disposed on the cap plate 100. The first and second terminal plates 111 and 121 are electrically connected to the first and second collector terminals 115 and 125, and may provide a terminal region wider than the first and second collector terminals 115 and 125. The first and second terminal plates 111 and 121 may be connected to the first and second collector terminals 115 and 125 via riveting or any other suitable combining method, e.g., welding and screwing.

Upper insulating members 112 and 122 may be disposed between the cap plate 100 and the first and second terminal plates 111 and 121, respectively. The upper insulating members 112 and 122 may insulate the first and second terminal plates 111 and 121 from the cap plate 100. Alternatively, when the first and second terminal plates 111 and 121 and the cap plate 100 have the same polarity, the upper insulating members 112 and 122 may be omitted.

The first and second collector terminals 115 and 125 may be drawn outside the cap plate 100 through the cap plate 100. Accordingly, a terminal hole 100,' into which the first and second collector terminals 115 and 125 are inserted, may be formed in the cap plate 100. In detail, the first and second collector terminals 115 and 125 may be inserted from a bottom of the cap plate 100 upward through the terminal hole 100' of the cap plate 100.

The first and second collector terminals 115 and 125 may include collector terminal fixing portions 115a and 125a and collector terminal flange portions 115b and 125b respectively formed at top and bottom of the first and second collector terminals 115 and 125 along a length direction. For example, the first and second collector terminals 115 and 125 may be assembled to penetrate through the cap plate 100, and may include the collector terminal fixing portions 115a and 125a exposed at the top of the cap plate 100, and the collector terminal flange portions 115b and 125b disposed at the bottom of the cap plate 100.

The collector terminal fixing portions 115a and 125a are used to fix locations of the first and second collector terminals 115 and 125, e.g., may be fixed with respect to top surfaces of the first and second terminal plates 111 and 121 via riveting. For example, the collector terminal fixing portions 115a and 125a have a flange shape expanding in a lateral direction from bodies of the first and second collector terminals 115 and 125, and may be fixed to the first and second terminal plates 111 and 121. A concave groove (not shown) may be formed on the top of the collector terminal fixing portions 115a and 125a according to pressurization of a processing tool (not shown) that rotates at a high speed. The tops of the collector terminal fixing portions 115a and 125a may be pressed in the lateral direction according to the pressurization of the processing tool, thereby adhering toward the top surfaces of the first and second terminal plates 111 and 121.

The collector terminal flange portions 115b and 125b may have a flange shape extending in a wider outer circumference than the terminal hole 100' such that the first and second collector terminals 115 and 125 do not escape through the terminal hole 100' of the cap plate 100. The first and second collector terminals 115 and 125 are inserted into the terminal hole 100' from the bottom of the cap plate 100, and the locations of the first and second collector terminals 115 and 125 may be fixed by riveting the collector terminal fixing portions 115a and 125a exposed at the top of the cap plate 100, while being supported at the bottom of the cap plate 100 by the collector terminal flange portions 115b and 125b.

The first and second collector terminals 115 and 125 may be inserted into the terminal hole 100' of the cap plate 100, and may be electrically insulated from the cap plate 100. For example, seal gaskets 113 and 123 may be inserted into the terminal hole 100', and the first and second collector terminals 115 and 125 may be inserted through the seal gaskets 113 and 123 so that the first and second collector terminals 115 and 125 are insulated from the cap plate 100. The seal gaskets 113 and 123 seal the terminal hole 100' so as to prevent the electrolyte accommodated in the case 180 from leaking, and also perform a sealing function of blocking external impurities.

As shown in FIG. 3, lower insulating members 114 and 124 may be disposed between the first and second collector terminals 115 and 125, and the cap plate 100, and may insulate the first and second collector terminals 115 and 125 from the cap plate 100. As such, by disposing the seal gaskets 113 and 123 around the terminal hole 100', through which the first and second collector terminals 115 and 125 penetrate, and disposing the lower insulating members 114 and 124 between the first and second collector terminals 115 and 125, and the cap plate 100, the first and second collector terminals 115 and 125 may be insulated from the cap plate 100. The lower insulating members 114 and 124 may extend between the collector members 117 and 127, and the cap plate 100.

The first and second collector terminals 115 and 125 may be electrically connected to the electrode assembly 150 through the collector members 117 and 127. The collector members 117 and 127 may include collector plates 117b and 127b forming bottoms of the collector members 117 and 127 and combined to the electrode assembly 150, and lead portions 117a and 127a forming tops of the collector members 117 and 127 and combined to the first and second electrode terminals 110 and 120, i.e., to the first and second collector terminals 115 and 125. The collector plates 117b and 127b may be combined to two edges of the electrode assembly 150, and may be welded to the first and second active-material-non-coated portions 151c and 152c formed at the edge of the electrode assembly 150.

The lead portions 117a and 127a may extend in a bent direction with respect to the collector plates 117b and 127b to face the first and second electrode terminals 110 and 120, and may be combined to the first and second electrode terminals 110 and 120. For example, through holes 117' and 127' of FIG. 2, into which the first and second collector terminals 115 and 125 of the first and second electrode terminals 110 and 120 are inserted, may be formed in the lead portions 117a and 127a, and the collector members 117 and 127 and the first and second collector terminals 115 and 125 may be combined to each other by welding around the lead portions 117a and 127a and the first and second collector terminals 115 and 125, which are inserted through the through holes 117' and 127'.

Figure 6:
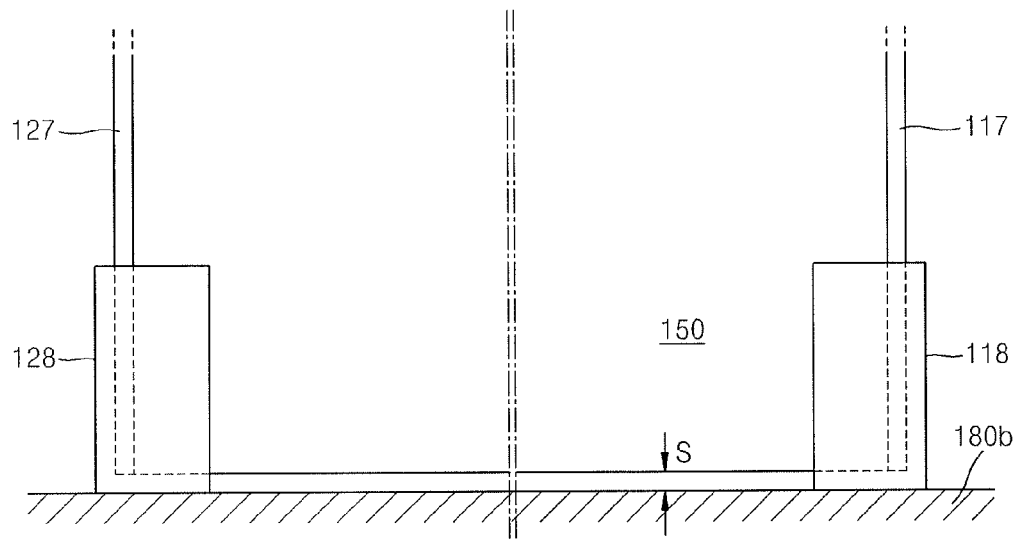
FIGS. 6 and 7 illustrate respectively schematic views of secondary batteries according to an embodiment and according to a Comparative Example, respectively.
Figure 7:
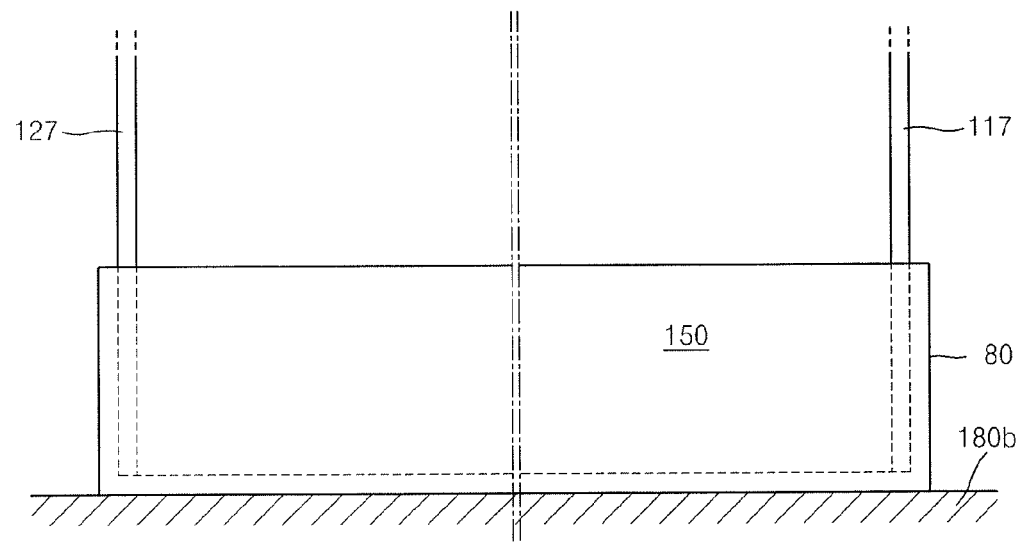

FIGS. 6 and 7 illustrate respectively schematic views of secondary batteries according to an embodiment and a Comparative Example, respectively.

According to the secondary battery of FIG. 6, the first and second retainers 118 and 128 are formed at two corner portions of the electrode assembly 150, wherein the first and second retainers 118 and 128 are spaced apart from each other. Thus, the center portion of the electrode assembly 150 is not covered by the first and second retainers 118 and 128, but is exposed. In other words, a predetermined space S may be defined at a bottom of the center portion of the electrode assembly 150.

In contrast, the secondary battery according to the Comparative Example of FIG. 7 includes the electrode assembly 150 and an insulating member 80 disposed below the electrode assembly 150. As shown in FIG. 7, the insulating member 80 is formed throughout the bottom of the electrode assembly 150, so a space is not formed below the electrode assembly 150.

The electrode assembly 150 may be formed by wounding the first and second electrode plates 151 and 152 and the separator 153 in a jelly roll shape. As the number of turns in the jelly roll of the electrode assembly 150 is increased, a facing area of the first and second electrode plates 151 and 152 having opposite polarities is increased. Thus, a storage capacity of the electrode assembly 150 is increased. Referring to FIG. 6, the number of turns may be increased through the predetermined space S obtained below the electrode assembly 150. In detail, by disposing the first and second retainers 118 and 128 at the bottom corner portion of the electrode assembly 150, the center portion of the electrode assembly 150 may be spaced apart from the bottom 180b of the case 180 to form the predetermined space S, so the number of turns may be increased. Even when the predetermined space S is formed only at the center portion of the electrode assembly 150, an overall number of turns may be increased since the predetermined space S is further obtained at the center portion that is relatively thick due to the first and second active material layers 151b and 152b. For reference, the first and second retainers 118 and 128 may contact, e.g., directly contact, the bottom 180b of the case 180 accommodating the electrode assembly 150 in FIG. 6, but such an arrangement is exemplary, e.g., the first and second retainers 118 and 128 may be spaced apart from the bottom 180b of the case 180.

Figure 8:
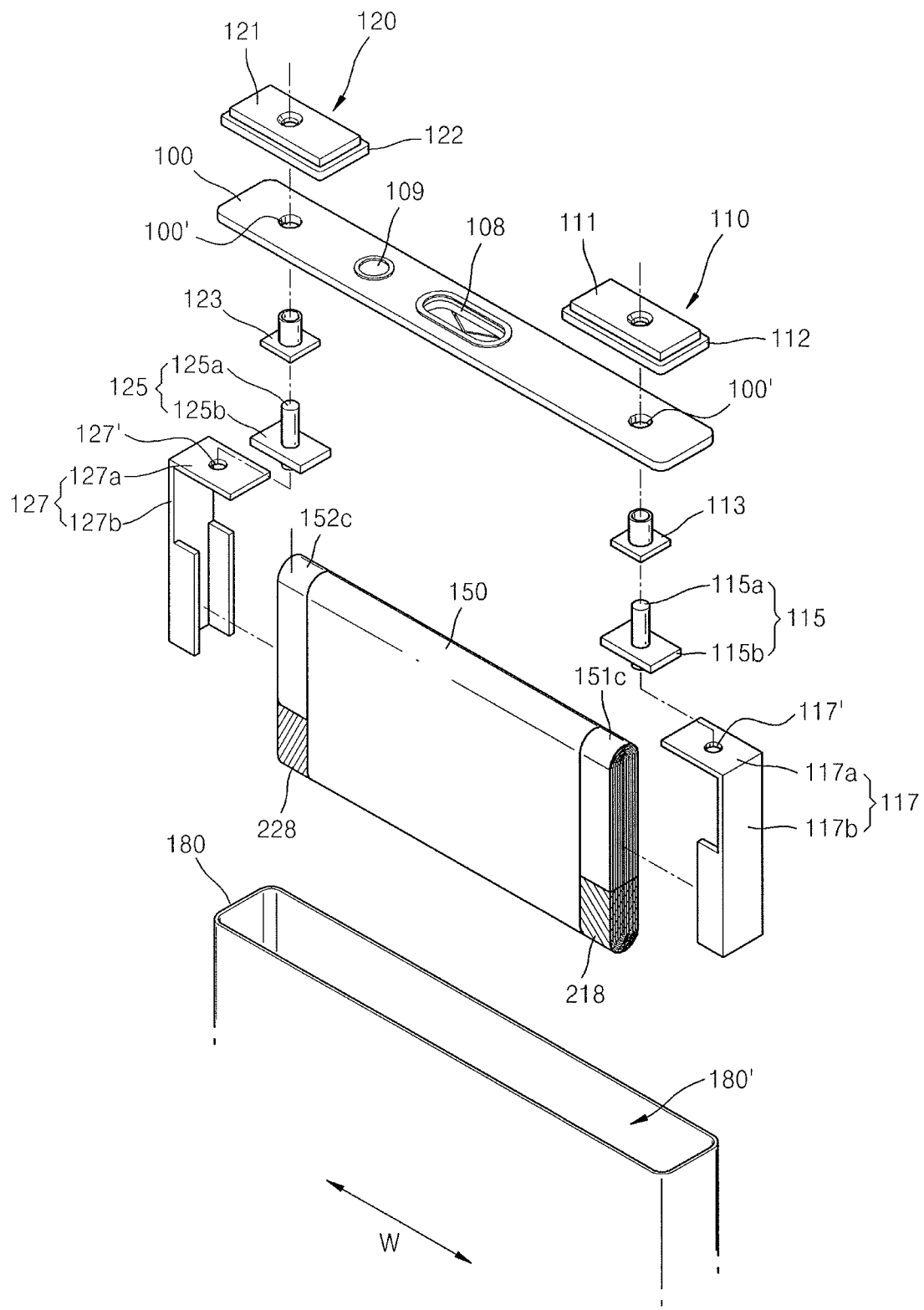
FIG. 8 illustrates an exploded perspective view of the secondary battery of FIG. 1 according to another embodiment.

FIG. 8 illustrates an exploded perspective view of a secondary battery according to another embodiment. Referring to FIG. 8, the secondary battery may include the electrode assembly 150, the case 180 having the opening 180' at the upper portion to accommodate the electrode assembly 150, and the cap plate 100 for covering the opening 180' of the case 180. The secondary battery may further include first and second coating units 218 and 228 coated on the corner portion of the electrode assembly 180 and formed between the electrode assembly 150 and the case 180. For example, the electrode assembly 150 may have the structure shown in FIG. 4, and thus, the same descriptions are not repeated.

The first and second coating units 218 and 228 prevent an electric short circuit between the electrode assembly 150 and the case 180, e.g., may prevent a short circuit path from forming between the electrode assembly 150 and the case 180 when an electrochemical reaction is generated between the first and second active-material-non-coated portions 151c and 152c of the electrode assembly 150, the case 180, and the electrolyte due to malfunctioning of the secondary battery or in an emergency situation, e.g., where a protection operation of a safety device, e.g., a fuse, needs to be performed.

For example, the first and second coating units 218 and 228 may be disposed on one end corner portion and the other end corner portion in the width direction W of the electrode assembly 150. The first coating unit 218 may be coated on the one end corner portion and the second coating unit 228 may be coated on the other end corner portion.

Figure 9:
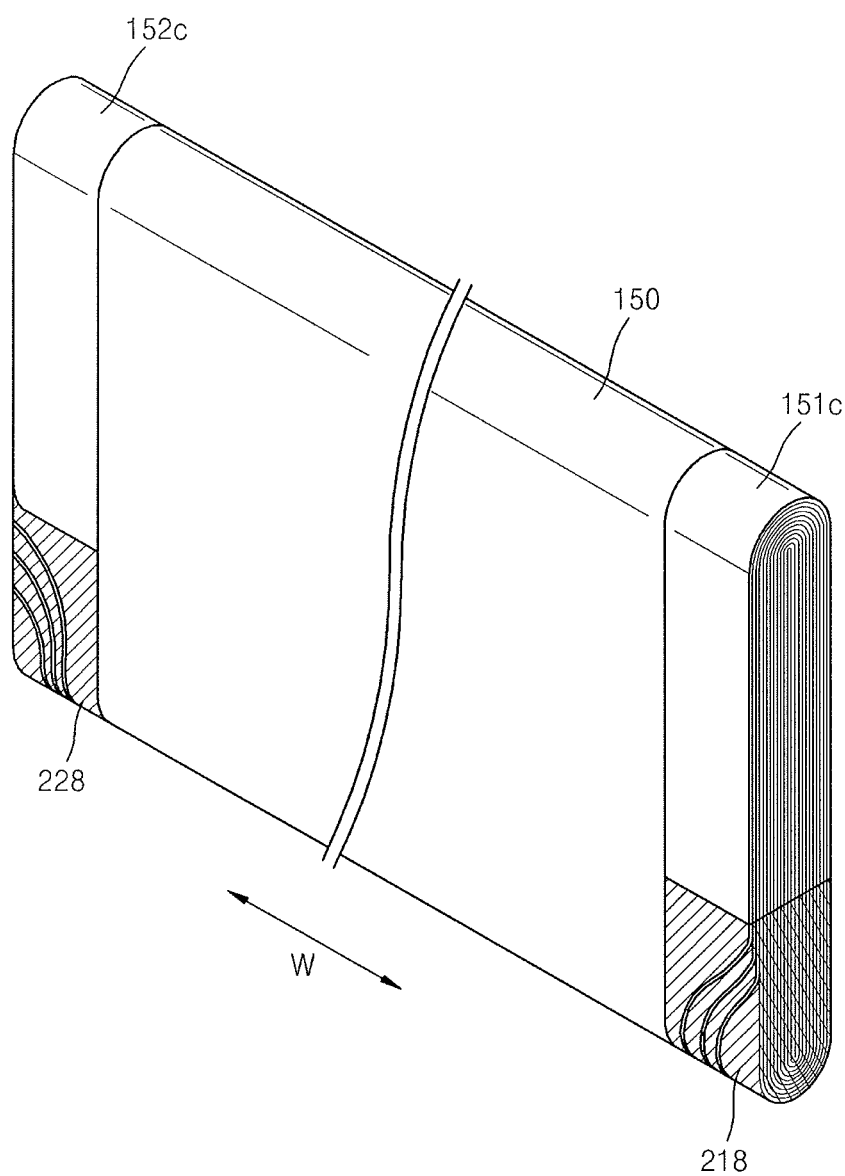
FIG. 9 illustrates a view of an arrangement between an electrode assembly and first and second coating units of FIG. 8.

FIG. 9 illustrates a view of an arrangement between the electrode assembly 150 and the first and second coating units 218 and 228 of FIG. 8. Referring to FIG. 9, the first and second coating units 218 and 228 are formed at the corner portion of the electrode assembly 150, e.g., may be formed at the bottom corner portion of the electrode assembly 150 near the bottom of the case 180 where the electrolyte is concentrated due its weight.

As shown in FIG. 9, the first and second electrode plates 151 and 152 may be concentrated in the corner portions (the first and second coating units 218 and 228) of the electrode assembly 150, e.g., the first and second active-material-non-coated portions 151c and 152c, where the first and second active material layers 151b and 152b are not formed in the first and second electrode plates 151 and 152, may be concentrated. For example, in the electrode assembly 150, wherein the first and second electrode plates 151 and 152, and the separator 153, are wound together in the roll shape, the first active-material-non-coated portions 151c that overlap each other and the second active-material-non-coated portions 152c that overlap each other may be respectively formed at the one end portion and the other end portion of the electrode assembly 150. The first coating unit 218 may be individually coated with respect to the first active-material-non-coated portions 151c formed at the one end portion of the electrode assembly 150, and similarly, the second coating unit 228 may be individually coated with respect to the second active-material-non-coated portions 152c formed at the other end portion of the electrode assembly 150.

As such, the first and second coating units 218 and 228 that are individually coated with respect to the first and second active-material-non-coated portions 151c and 152c may be formed by impregnating the corner portion of the electrode assembly 150 in a bath (not shown) containing a coating solution. For example, when the electrode assembly 150 is formed by winding the first and second electrode plates 151 and 152, and the separator 153 in the jelly roll shape, the electrode assembly 150 is formed such that the first active-material-non-coated portions 151c and the second active-material-non-coated portions 152c are disposed respectively at one end and other end along the width direction W, and the one end corner portion and the other end corner portion of the electrode assembly 150 are sequentially dipped in the bath containing the coating solution so that the first and second coating units 218 and 228 are formed respectively on the first and second active-material-non-coated portions 151c and 152c. Accordingly, the first and second coating units 218 and 228 may be individually formed on the first and second active-material-non-coated portions 151c and 152c. The electrode assembly 150, on which the coating solution is coated, may be strongly adhered on the first and second active-material-non-coated portions 151c and 152c via a hardening process, if required.

The first and second coating units 218 and 228 may be formed of a material having an electric insulating property, e.g., may be formed of a resin-based material. For example, the first and second coating units 218 and 228 may have fluidities that vary with the temperature or light irradiation thereon, and may be formed of a resin-based material that may be naturally dried, thermally hardened, or optically hardened.

According to the current embodiment, a potential electric short circuit between the case 180 and the first and second active-material-non-coated portions 151c and 152c of the electrode assembly 150 may be prevented or substantially minimized by performing a coating process, without having to use separate units, such as the first and second retainers 118 and 218. In the coating process, the bottom corner portion of the electrode assembly 150 is impregnated in a bath containing the coating solution, e.g., the coating solution is infused into the electrode assembly to become part thereof, so the first and second active-material-non-coated portions 151c and 152c of the electrode assembly 150 may be insulated via a simple process.

As described above, according to the one or more of the above embodiments, insulating units may be on bottom corners of the electrode assembly, e.g., an attached insulating retainer unit or an impregnated insulating resin unit, to separate and insulate the electrode assembly from the case. Therefore, an electrochemical reaction caused as a reverse potential of a high voltage formed between an electrode assembly and a case, or a short circuit caused by a sludge formed during the electrochemical reaction may be prevented or substantially minimized, even during malfunction of the secondary battery during operation of a safety device, e.g., a fuse. Also, potential accidents, e.g., an explosion due to an electric short circuit between the electrode assembly and the case, may be reduced, thereby improving stability of the secondary battery.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A secondary battery, comprising:
   a case having an opening at an upper portion;
   an electrode assembly accommodated in the case, the electrode assembly having an active material layer coated portion and an active-material-non-coated-portion, first and second bottom corner portions of the active-material-non-coated-portion being adjacent to a bottom of the case, and a center portion in the active material layer coated portion being between the first and second bottom corner portions;

a cap plate at the upper portion and covering the opening of the case;

a first electrically insulating retainer surrounding the first bottom corner portion, and a second electrically insulating retainer surrounding the second bottom corner portion, the first retainer and the second retainer each being between the electrode assembly and the bottom and corresponding sides of the case; and a first collector member between the electrode assembly and the first retainer, and a second collector member between the electrode assembly and the second retainer, wherein:

the center portion is spaced apart from the bottom of the case such that a gap is defined between a bottom of the center portion and the bottom of the case, the gap being between the first retainer and the second retainer in a width direction of the electrode assembly, the first and second retainers being disconnected from each other with an empty space completely separating therebetween in the width direction of the electrode assembly so as to expose the center portion, and each of the first and second retainers has an uppermost portion that is disposed below a midline of the electrode assembly in a height direction of the electrode assembly such that the first and second retainers each only partially overlap heights of the respective first and second collector members.

2. The secondary battery as claimed in claim 1, wherein the electrode assembly includes a first electrode plate, a second electrode plate, and a separator therebetween, the first electrode plate, the second electrode plate, and the separator being wound together into a roll shape, wherein the active-material-non-coated-portion includes:

a plurality of active-material-non-coated portions of the first electrode plate overlapping each other and positioned at the first bottom corner portion, and a plurality of active-material-non-coated portions of the second electrode plate overlapping each other and positioned at the second bottom corner portion.

3. The secondary battery as claimed in claim 2, wherein:
the first retainer surrounds the plurality of active-material-non-coated portions of the first electrode plate; and
the second retainer surrounds the plurality of active-material-non-coated portions of the second electrode plate.

4. The secondary battery as claimed in claim 1, wherein each of the first and second retainers include:
first and second walls facing each other and surrounding main surfaces of the electrode assembly, and having an uppermost extent that is disposed below the midline of the electrode assembly;
a side wall surrounding a side surface of the electrode assembly, the side wall being between the first and second walls, and having an uppermost extent that is disposed below the midline of the electrode assembly; and
a bottom wall surrounding a bottom of the electrode assembly, the bottom wall being between the first and second walls such that the bottom wall does not extend farther than the first and second walls in the width direction of the electrode assembly.

5. The secondary battery as claimed in claim 4, wherein the first and second walls, the side wall, and the bottom wall define an accommodation space, the respective bottom corner portions being inserted into and accommodated in the accommodation space.

6. The secondary battery as claimed in claim 1, wherein the first and second retainers include no linking structure therebetween.

* * * * *